UNITED STATES PATENT OFFICE.

HUGO GERRESHEIM, OF COLOGNE-EHRENFELD, GERMANY.

PROCESS OF REDUCING NITRO COMPOUNDS.

SPECIFICATION forming part of Letters Patent No. 691,132, dated January 14, 1902.

Application filed May 16, 1901. Serial No. 60,575. (No specimens.)

*To all whom it may concern:*

Be it known that I, HUGO GERRESHEIM, a subject of the Emperor of Germany, residing at Cologne-Ehrenfeld, Germany, have invented a certain new and useful Reducing Process by Means of Iron and Alkali, of which the following is a specification.

Besides the old and industrially-available methods for effecting the reduction of nitro compounds and other substances related thereto by means of iron or tin in acid solution or by zinc-dust in alkaline solution several other methods have also been devised. V. Dechend has tried to effect the reduction of nitro compounds by means of zinc (with or without the addition of iron) in presence of aqueous-salt solutions. This method is described in German Patent No. 43,230, which has lapsed. Then Whol (*Reports of the Proceedings of the German Chemic. Soc.*, 1894, fol. 1432) has worked with zinc or iron in neutral solution and has succeeded in obtaining hydroxylamin derivatives by the action of zinc in the presence of neutral salts, (German Patent No. 84,138,) and when working with iron in neutral solution he has even obtained small quantities of anilin; but all these methods were not worked on a manufacturing scale, and the same holds true of the reaction for the obtainment of azo bodies by means of finely-distributed lead in alkaline solution. (Wohl, German Patent No. 81,129, now lapsed.) This was due in part to the very unsatisfactory yields and then in view of these methods being too expensive for practical working. The only cheap reducing agent within easy reach is iron.

I have found that iron and alkali in mixture possess very marked reducing properties. If this agent is applied to nitro-benzol, for instance, I obtain thereby azoxy-benzol, azo-benzol, hydrazo-benzol, and anilin, and I am also enabled to obtain any of these bodies separately. Thus I may, for instance, obtain hydrazo-benzol by the reduction of azoxy-benzol or azo-benzol, and so on.

By using sodium hydrate, for instance, as the alkaline agent the reducing action seems to be such that the metallic iron is first converted into a sodium salt of the oxid of iron, which forms a thick paste with the excess of sodium hydrate used, and from which on the addition of water hydroxid of iron or oxid of iron may be separated as a brown powder in a state of very fine subdivision, which is very suitable for use as a painting material. The solution of sodium hydrate resulting after the separation may be concentrated and used over again for reducing new quantities of material.

I may mention as a further technical advantage as compared with the reducing process by means of zinc-dust and alkali that the expensive zinc-dust is replaced by the comparatively inexpensive iron. In view of the lower molecular weight of the latter and in consequence of its property of becoming oxidized into the oxid $Fe_2O_3$ a considerably smaller quantity of iron is used for the reduction than in the case of zinc-dust, which can only oxidize into ZnO.

Thus, for instance, for manufacturing hydrazo-benzol from one thousand (1,000) kilograms nitro-benzol it needs only nine hundred to one thousand (900 to 1,000) kilograms iron instead of sixteen hundred (1,600) kilograms of zinc-dust, the price of which is about ten times as high as that of iron. Then in my invention the alkali used can be recovered, while in the process of reduction by zinc in alkaline solution the alkali is not only lost, but requires corresponding quantities of acid for neutralization.

*Example of reducing a nitro compound into azoxy or into azo or hydrazo compound.—* One thousand kilograms nitro-benzol and seven hundred and fifty kilograms of iron are put into a suitable vessel provided with an agitator and with means for heating and cooling the contents of it. Then the heat is raised to ninety (90°) degrees centigrade. Strong sodium hydrate in solution or a mixture of sodium-hydrate solution and of solid sodium hydrate is then added gradually, the temperature being kept at about 100° to 110° centigrade by the admission of steam or of cooling-water. After three hundred (300) kilograms of sodium hydrate have been added a further quantity of three hundred (300) kilograms of sodium hydrate is added with seven hundred and fifty (750) kilograms more of iron. The reducing action first leads to the formation of azoxy-benzol, and after the nitro compound has been used up azo-benzol is formed. Only after nearly all the azoxy-benzol has been converted into azo-benzol and the temperature of solidification of the mass has gone up to about 63° centigrade hydrazo-benzol is formed. Thus the process may be interrupted at any stage for the manufacture of azoxy-benzol or of azo-benzol or of hydrazo-benzol.

For the reduction to hydrazo-benzol the temperature may be raised so that the hydrazo-benzol forms a molten mass and may after the reduction has been finished (which is indicated by the liquid becoming almost colorless) be poured off and allowed to run into molds, where it solidifies. The remaining paste is diluted with water. Not used up metallic iron will then deposit and hydroxid or oxid of iron is separated. The sodium hydrate is then evaporated for the purpose of further reductions. The iron that has not been used up is used over again. For each one thousand (1,000) kilograms of the nitro compound only from nine hundred to one thousand (900 to 1,000) kilograms of iron are used.

It is obvious that the relative proportions of sodium hydrate, of water, and of nitro compound, &c., and the temperature may be changed and may be different from those given by way of examples.

Instead of submitting the nitro compounds, &c., alone to the reducing process the process may also be carried out with nitro compounds, &c., in solution of hydrocarbons or alcohols. This is especially advisable in the case of substances whose hydrazo compounds show a high temperature of solidification.

What I claim, and desire to secure by Letters Patent of the United States, is—

The process for effecting the reduction of organic nitro compounds and of intermediate reduction products still capable of reduction which consists in the treatment of these substances with iron and alkali, substantially as described.

In witness whereof I have hereunto set my hand in presence of two witnesses.

HUGO GERRESHEIM.

Witnesses:
CHARLES L. SIMPLE,
KARL SCHMITT.